United States Patent [19]

Nourse

[11] Patent Number: 5,534,782
[45] Date of Patent: Jul. 9, 1996

[54] AUTOMATIC RECLOSING CIRCUIT BREAKER USING CONTROLLABLE FEEDER TRANSDUCER

[75] Inventor: George R. Nourse, Bolivar, Ohio

[73] Assignee: Controlled Power Limited Partnership, Canton, Ohio

[21] Appl. No.: 153,622

[22] Filed: Nov. 17, 1993

[51] Int. Cl.⁶ .......................... G01R 31/00; H02H 11/00
[52] U.S. Cl. .................. 324/500; 324/522; 324/601; 361/60
[58] Field of Search .................... 324/500, 512, 324/522, 523, 527, 531, 539, 555, 601, 96; 361/59, 60; 335/68

[56] References Cited

U.S. PATENT DOCUMENTS

| | | | |
|---|---|---|---|
| 2,358,136 | 9/1944 | Anderson et al. | 361/60 |
| 3,609,459 | 9/1971 | Thompson | 361/60 |
| 3,704,392 | 11/1972 | Chen et al. | 361/60 |
| 3,936,742 | 2/1976 | Krause | 324/96 |
| 4,232,232 | 11/1980 | DeLacy et al. | 361/60 X |
| 4,454,555 | 6/1984 | DeLacy | 361/59 |
| 4,999,730 | 3/1991 | Pickard | 361/59 |
| 5,029,039 | 7/1991 | Yeh | 361/59 |

FOREIGN PATENT DOCUMENTS

| | | | |
|---|---|---|---|
| 0303012 | 12/1989 | Japan | 361/60 |
| 1478277 | 5/1989 | U.S.S.R. | 361/60 |

OTHER PUBLICATIONS

IMPulse NC Inc. "Innovative Motion Power" Product Bulletin Undated.

Primary Examiner—Kenneth A. Wieder
Assistant Examiner—Diep Do
Attorney, Agent, or Firm—Rankin, Hill, Lewis & Clark

[57] ABSTRACT

Automatic reclosing apparatus for a DC feeder circuit breaker connectable between a main power bus and a feeder line, including a transducer connectable to the feeder line and a return bus for producing an output signal that corresponds to voltage on the feeder line; and a programmable controller connectable to the breaker for reclosing the breaker when a fault condition is absent and for preventing breaker closure when a fault condition is present; the controller being coupled to the transducer for detecting zero offset and full scale calibration of the transducer output signal. The apparatus can also determine negative return voltage and use such determination to improve accuracy of a load measurement test. The zero offset and full scale calibration functions can be used to implement open and short circuit tests of the apparatus.

32 Claims, 5 Drawing Sheets

AUTOMATIC RECLOSING CIRCUIT BREAKER USING CONTROLLABLE FEEDER TRANSDUCER

BACKGROUND OF THE INVENTION

The invention relates generally to DC feeder circuit breaker control systems. More particularly, the invention relates to methods and apparatus for automatic reclosing of a circuit breaker.

DC circuit breakers are well known. One particular application is the use of a circuit breaker in a DC feeder line for a transit system. The DC power for electrically operated trains, for example, is provided from one or more electric substations through a DC feeder line and return. A circuit breaker is connected in the feeder line circuit so that when a fault occurs the breaker is tripped and power is disconnected from the feeder line and track circuit. The circuit breaker is not permitted to be reclosed until it is first determined that the fault no longer exists in the feeder line and track circuit.

Over the years, different control systems have been designed to provide automatic reclosure of the breaker after a trip occurs. Typically, an attempt to reclose a breaker is made after first checking the feeder line for a fault condition. This is done by performing a check generally known as a load measurement test. A load measurement test typically is performed by injecting a test current into the feeder circuit, such as by connecting a load measurement resistor (LMR) between the DC main power bus (connected to the substation supply) and the feeder line. The feeder line voltage referenced to the return line can then be used to determine the load on the feeder circuit and hence the presence or absence of a fault condition. Typically, a fault condition corresponds to a feeder circuit impedance of 0.2 to 1 ohm or less.

Known systems for automatic reclosing of a feeder circuit breaker typically use a combination of cam timers, latching relays, meter relays and timers. Although such apparatus can be used successfully, their designs have inherent limitations and aspects that are not ideal. Latching relays are expensive, and cam timers are difficult to adjust to required timing accuracies. Meter relays tend to be sensitive to induced transient voltages in the associated switchgear, such as by breaker closure and relay operations. The different types of control devices used in such known systems also tend to require different power sources, rather than all being powered from a reliable source such as the station battery. Overall, the systems tend to be quite complex and expensive without an appreciable degree of flexibility. Each system is typically designed as a unique system for a particular application.

It is desirable, therefore, to provide an automatic reclosing system that uses more state of the art technology, such as programmable solid state controllers. However, efforts to date have proven to be less than adequate because such systems fail to accurately account for negative return voltage, and also the fact that such systems are susceptible to drift from temperature variations. Calibration of such systems is typically based on adjustments at the factory, not in the field. This is because known programmable controller systems use transducer devices that provide for transformer coupled isolation of the high voltage feeder circuit from the controller hardware. Such isolation is used in large measure as a safety consideration to isolate the track potentials from the control circuit. Once the hardware is installed in a switchgear, however, there is no way to calibrate the system because the controller simply receives the transducer output as a control parameter. The use of transformer coupled isolated transducers to the extent known heretofore has also not permitted the inclusion of a self-test capability of the automatic reclosing system.

A significant problem with known automatic reclosing systems is that they tend to be sensitive to the presence of negative return voltage, such as occurs with multiple track and feeder circuits. This negative return voltage affects the accuracy of the load measurement process.

The objectives exist, therefore, for an automatic reclosing system for a DC feeder circuit breaker, which system can be easily configured for different installations, while also being capable of self-test functions, calibration, and offset error correction. Such a system should also include flexibility when configuring the system for a particular installation.

SUMMARY OF THE INVENTION

To the accomplishment of the foregoing objectives, the invention contemplates, in one embodiment, automatic reclosing apparatus for a DC feeder circuit breaker connectable between a main power bus and a feeder line, comprising: transducer means connectable to the feeder line and a return bus for producing an output signal that corresponds to voltage on the feeder line; and programmable control means connectable to the breaker for reclosing the breaker when a fault condition is absent and for preventing breaker closure when a fault condition is present; said control means being input coupled to said transducer means for controlled calibration of said transducer means output signal.

These and other aspects and advantages of the present invention will be readily understood and appreciated by those skilled in the art from the following detailed description of the invention with the best mode contemplated for practicing the invention in view of the accompanying drawings.

DETAILED DESCRIPTION OF THE INVENTION

Figure 1:
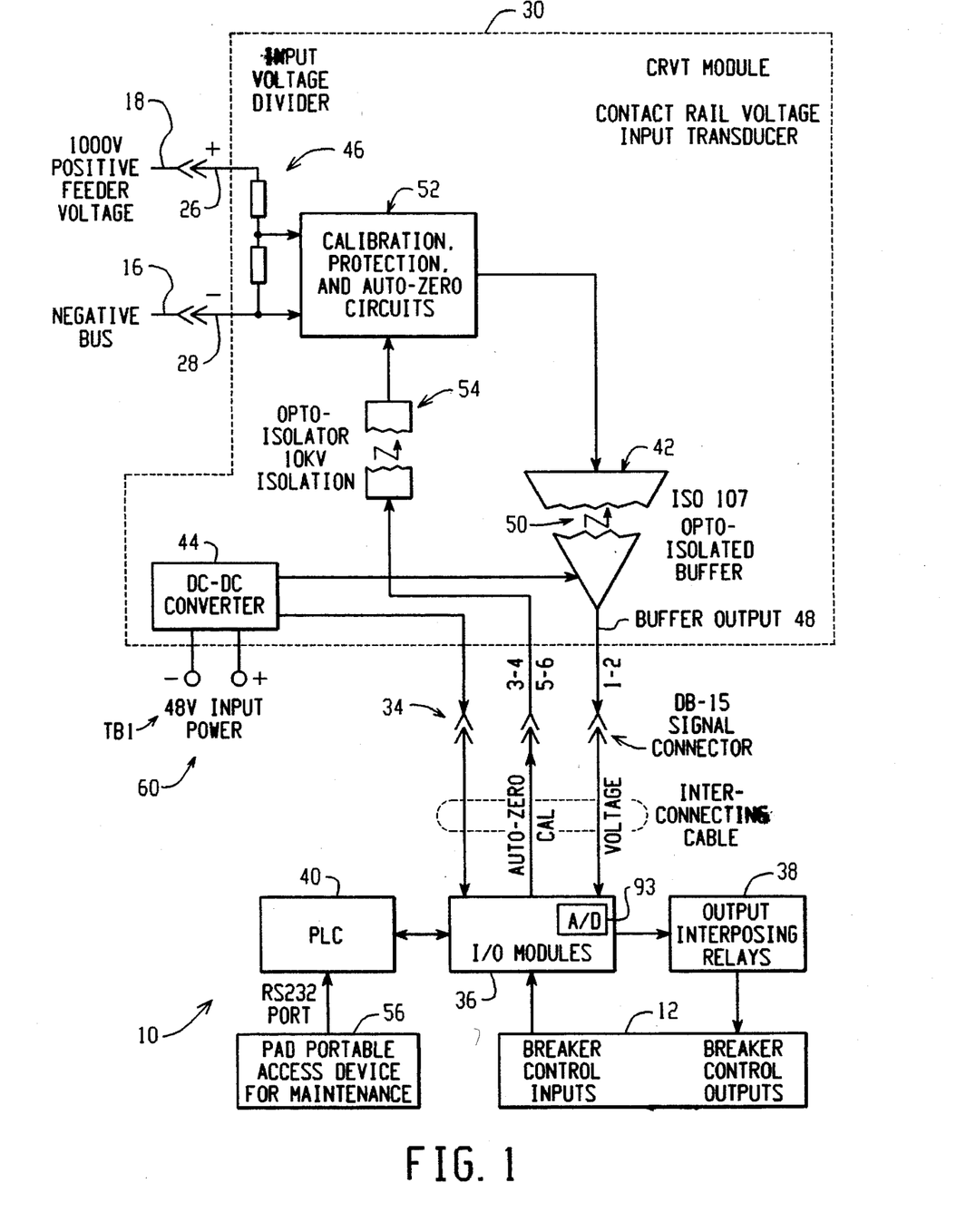
FIG. 1 is an electrical schematic in functional block diagram form of an automatic reclosing apparatus for a DC feeder circuit breaker in accordance with the present invention.
Figure 2:
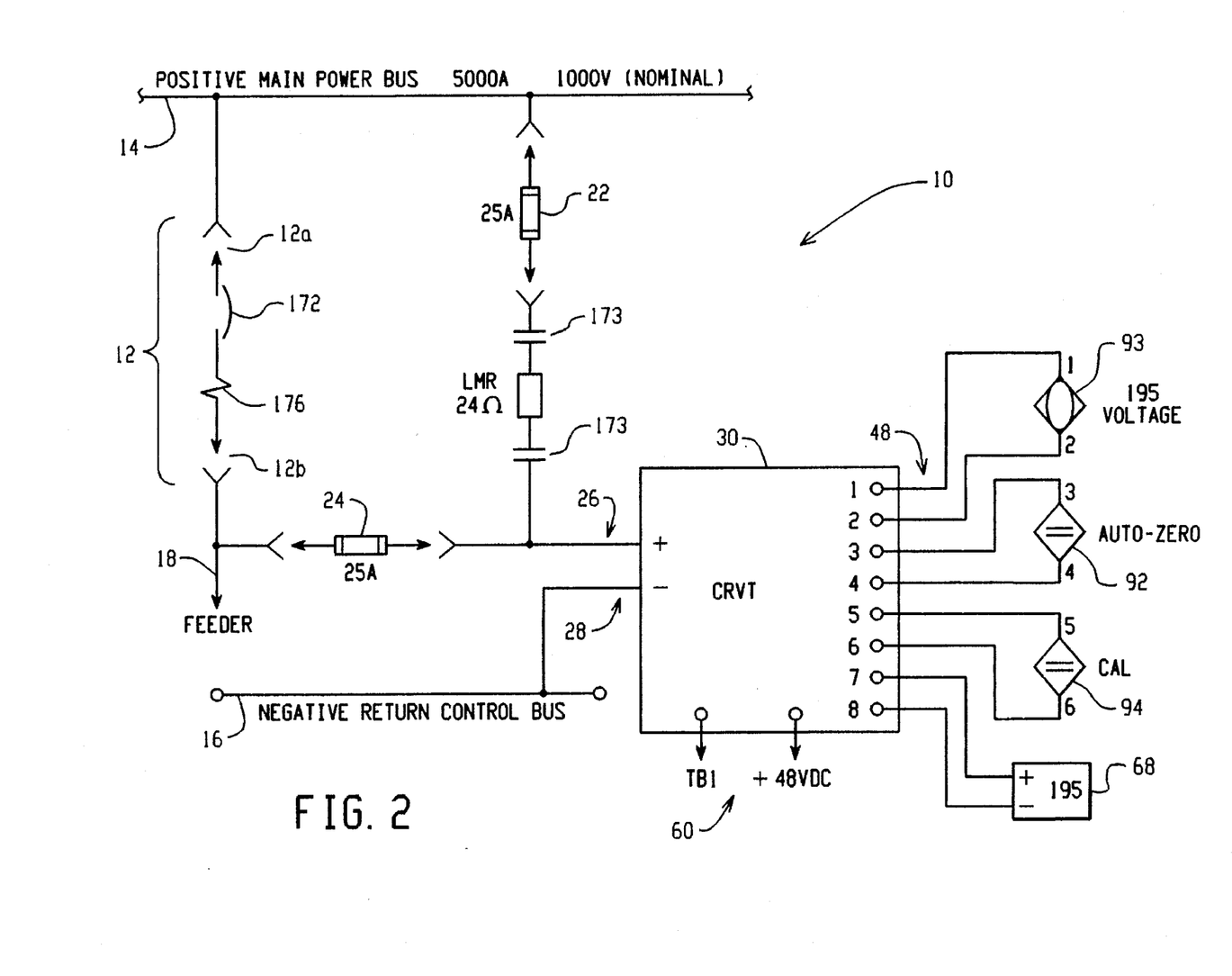
FIG. 2 is an electrical schematic diagram of the interface of a transducer to a DC feeder circuit in accordance with the invention.

With reference to FIGS. 1 and 2, there is shown in block diagram form an apparatus 10 for controlling automatic reclosure of a circuit breaker. For clarity the circuit breaker 12 is omitted in FIG. 1, but is shown in schematic form in FIG. 2. FIG. 1 shows the general configuration of one embodiment of the control apparatus 10, while FIG. 2 shows, in a simplified manner, one embodiment for interfacing the control apparatus to a DC feeder circuit. The apparatus 10 is also referred to herein and in the drawings as an automatic reclosing relay device 195, since that is its overall function from a system standpoint. As used herein, all three digit reference numbers correspond to device function numbers, 195 in the case of the relay device for example, according to industry standard device function numbers specified in IEEE STANDARD ELECTRICAL POWER SYSTEM DEVICE FUNCTION NUMBERS, IEEE Std. C37.2–1991. For example, the last two digits 95 refer to the industry standard function number for the device, and the "1" is used herein to refer to a DC device.

While the invention is described herein with particular reference to a DC feeder circuit, and more particularly to an automatic reclosing apparatus for a circuit breaker used in such a circuit, such description should not be construed in a limiting sense. Those skilled in the art will readily appreciate that the teachings of the present invention can be applied in many different applications wherein it is desired to achieve safe reclosure of a circuit breaker based in part on an accurate load measurement, as well as to implement self-test functions.

In the described example, a typical feeder circuit includes a main power bus 14 and return bus 16 that is connected to a substation (not shown) that supplies power to the transit system, such as 1000 VDC nominal at 5000 amps nominal. The circuit breaker 12 is connected between the power bus 14 and a feeder line 18, which is electrically tied to the contact rail for the trains on the transit system tracks. When the contact rail is energized by more than one substation, this is generally referred to as a tied condition, whereas a stub condition is when the contact rail is energized from one substation. In the tied condition, a voltage can appear on the feeder line 18, even if the circuit breaker 12 is tripped, as is well known to those in the art.

The circuit breaker 12 can be of any type for purposes of the present invention, and its operation is controlled and monitored by a series of switching and/or latching relays, meter relays and so on. Typically, the breaker is connected to the feeder circuit by racking the breaker into a switchgear breaker cell (not shown). When the breaker is in the connected position in the cell, connections 12a and 12b are made. When the breaker is racked out of the cell, referred to herein as the test position, the connections 12a and 12b are open. The circuit breaker 12 typically includes a series trip device 176 for sensing current through the breaker when the breaker is closed, and will trip the breaker under fault conditions.

Closure of the breaker 12 main contacts 172 can be effected by the PLC by activation of appropriate control relays 38 (described hereinafter). A load measurement resistor (LMR) is connectable between the main power bus 14 and the feeder line 18 by a pair of contacts 173. The contacts 173 are part of a control relay device (one of the devices 38) under control of the PLC by an I/O module. When the circuit breaker is racked in the test position, the 173 control relay should not be actuated because voltage would be applied to the track circuit creating a potentially hazardous condition. Therefore, the load measurement operation cannot be performed when the circuit breaker 12 is in the test position. This is a safety consideration to prevent applying high voltage to the feeder circuit without a circuit breaker present. Fuses 22 and 24 are provided for protection of the load measuring circuit. The transducer feeder voltage input 26 is connected to the feeder line 18, and is connectable to the power bus 14 through the LMR when the contacts 173 by the PLC. The negative return bus 16 is connected to a negative input 28 of the transducer 30.

Those skilled in the art will further appreciate that when the circuit breaker 12 is racked in the test position, it still has electrical power delivered thereto, such as from a 125 VDC control supply or, in the example herein, a 48 VDC control supply from the associated substation(s); however, closure of the breaker will not connect the power bus 14 to the feeder circuit. This permits operation of the breaker to be tested in accordance with the present invention independent of a load measurement test.

As shown in FIG. 1, the transducer 30 is interfaced to a programmable logic control device (PLC) 40. The functional elements which in this embodiment are included in the transducer unit 30 are enclosed by the dotted box. Thus a series of mechanical connections 34 (such as, for example, conventional male/female edge connectors) are used to electrically couple the transducer unit 30 to the PLC through an input/output (I/O) module board 36.

The I/O modules are used to provide appropriate voltage interface connections between the PLC and the transducer 30 as well as the circuit breaker 12. The PLC controls operation of the breaker 12 by operation of various interposing relays 38. The relays 38, and related circuit breaker electronics are not shown in detail in the drawings because they can be conventional in design and function in accordance with established specifications, as is well known to those skilled in the art. These operations will be described in more detail hereinafter.

The PLC can be programmed in a conventional manner to control operation of the relays 38 and thereby control operation of the circuit breaker 12o Specific implementation of these control functions will depend, of course, on the particular installation. These control functions are conventional and form no particular part of the present invention other than the fact that the use of a PLC device 40 permits substantial flexibility in configuring the apparatus 10 for a specific application, and also increases the number of different control functions and monitoring functions that can be accomplished with appropriate software design. Rather, the invention is more generally directed to the design aspect of the transducer 30 and the transducer/PLC interface and operation, in which the PLC exercises control over operation of certain functions in the transducer, thus permitting offset compensation, calibration, accurate negative return voltage measurement and various self-test functions.

The circuit breaker electronics (including electronics that may physically be located in the breaker unit or the breaker cell or elsewhere in the switchgear) includes a number of control monitor inputs to the PLC via the I/O interface 36. Such inputs can include, for example, signals that indicate status of various relays in the overall system, or as another example may indicate the position of the breaker (e.g. whether it is in the connected or test position).

As shown in FIG. 1, the transducer unit 30 includes an optically isolated voltage buffer 42 that is energized by a power supply 44 (in the form of a DC to DC converter), and an internally isolated power supply that is integral with the buffer 42. The power supply 44 is connected to the substation +48 VDC supply at a terminal block TB1 in the switchgear or on the circuit breaker unit. A resistor voltage divider circuit 46 is used to divide the feeder line voltage to a range that is suitable as an input to the buffer 42.

A basic function of the buffer 42 is to produce an output voltage (noted at 48 in FIG. 1) that corresponds to the voltage present on the feeder line 18. The buffer output 48 is coupled to the PLC via an analog to digital converter 93 I/O module on the I/O board 36. The PLC can thus monitor the status of the voltage on the feeder line for purposes that will be explained in greater detail herein. The buffer 42 provides optical isolation (noted at 50) of the feeder line voltage from the I/O electronics. Alternatively, transformer isolation or other means could be used, however, optical isolation is preferred because it can more economically provide a higher level of reliable voltage isolation.

In accordance with an important aspect of the present invention, the transducer unit 30 includes a zero offset (also referred to herein as an auto-zero function) and voltage calibration control circuit 52. The term "calibration" as used herein is intended to generally include the zero offset and voltage calibration functions, since zero offset adjustment is one example of a calibration step. However, the calibration circuit 52 can also used to perform additional calibration functions such as full scale calibration as will be described.

The calibration circuit 52 is controllable by the PLC via an optically isolated interface circuit 54. Thus, the PLC and I/O modules are completely isolated optically from the high voltage of the feeder circuit and transducer unit. The circuits 52 and 54 are optically actuated by the PLC, but are electrically energized by the transducer 30 circuit through the power supply 44 and the internally isolated supply of the buffer 42, as shown in detail in FIG. 3.

The PLC may also be programmed to interface with a remote keypad input device 56. The input device 56 could alternatively be permanently installed as a front panel control device or pad. The input device can thus be used to configure the apparatus to for the particular installation, as well as to perform diagnostics, maintenance and other functions as required.

Before going into a detailed description of a transducer 30 embodiment, the general functions of the apparatus 10 will be described. In order to realize an automatic reclosing apparatus and control function for a circuit breaker, the PLC is programmed to monitor various inputs from the circuit breaker unit, such as, for example, various contact states that indicate whether the breaker is racked in the connected or test position, what type of event last caused the breaker to trip and so on. This information is input to the PLC from the breaker and switchgear circuits via the I/O modules on the I/O board 36. Various control parameters can be set in the PLC permanent memories, or can be installed via the remote input device 56.

After a breaker has tripped due to a fault in the feeder circuit, the apparatus 10 verifies that the fault condition is no longer present before attempting to reclose the breaker. This is generally accomplished by the load measurement test with the breaker in the connected position. The load measurement test is performed by connecting the LMR to the feeder line 18, and then measuring the feeder line voltage via the transducer 30 and PLC. By measuring the feeder line voltage with a measurable current flowing into the feeder circuit, the feeder circuit impedance can be tested and if too low reclosure will be inhibited. Because load measurement is based in part on the voltage measured at the feeder line input to the transducer 30, the presence of negative return voltage on the feeder line 18 will affect the accuracy of the load measurement if not taken into account. In accordance with the invention, the PLC determines the negative return voltage before the LMR is connected into the feeder circuit, and uses the measured negative return voltage as an offset to improve the accuracy of the load measurement. The PLC can also determine whether the negative return voltage is within programmable tolerances (setpoints). In addition, the PLC determines if there is a zero offset error from the transducer 30 to further improve the accuracy of the load measurement test. Zero offset adjustment is useful because the transducer 30 output is 10 VDC full scale for a monitored voltage of up to 1500 VDC. Therefore, even a small offset or error in the transducer output can cause the PLC to control operation of the breaker based on erroneous data.

In addition to checking for zero offset and negative return voltage, the PLC can execute a voltage calibration test for the transducer 30. In this manner the PLC can determine whether the buffer circuit 48 in particular is operational and in calibration. Such calibration further increases the accuracy of the load measurement test.

A significant advantage of the direct control by the PLC over the operation of the transducer unit 30 is that the PLC can also perform circuit breaker operational tests, such as short circuit and open circuit tests, when the breaker is racked in the test position. These tests can conveniently be performed concurrently with the calibration tests, without having to perform the load measurement test. Thus, the apparatus 10 permits a complete automated test of the feeder circuit and the circuit breaker prior to a reclosure attempt.

The PLC can be any suitable programmable device. One device that has been used successfully to implement the present invention is a MicroDAC controller available from Grayhill Inc. A particular advantage of this unit is that I/O modules are available specifically designed to interface with the MicroDAC unit. A suitable analog to digital input voltage module 93, such as used to interface the transducer output 48 to the PLC, is part no. 73G-IV10; a suitable DC input voltage module, such as used for providing an input signal to the PLC to indicate contact status, is part no. 70G-IDC5G; and a suitable DC output module, such as used by the PLC to control actuation of various relays, is part no. 70G-ODC5A-all of which are available from Grayhill Inc. The remote interface 56 can be coupled to the PLC in a conventional manner, such as using a standard RS-232 serial port.

Figure 3A:
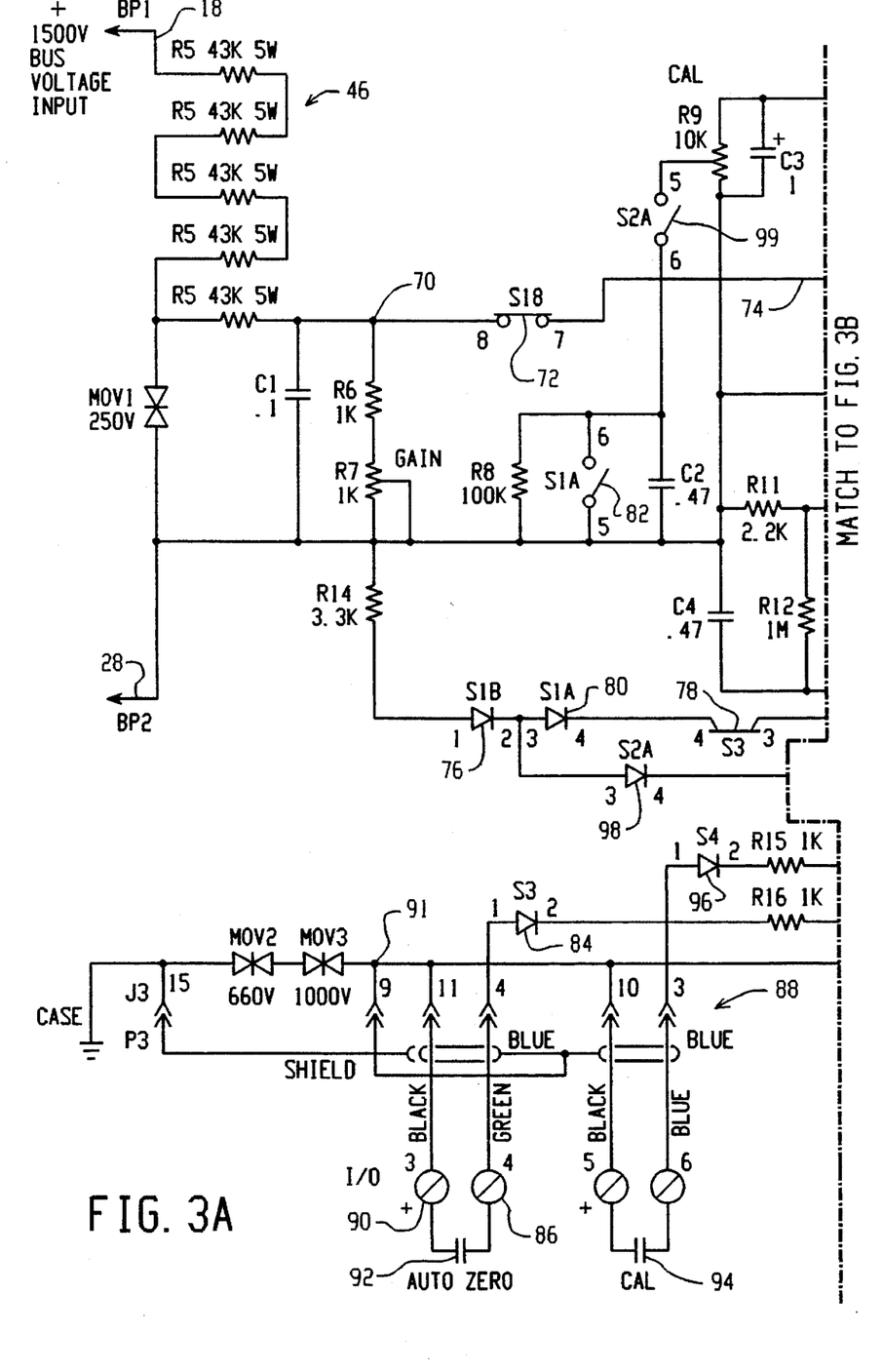
FIG. 3 is a detailed schematic diagram of a transducer unit suitable for use with the present invention.
Figure 3B:
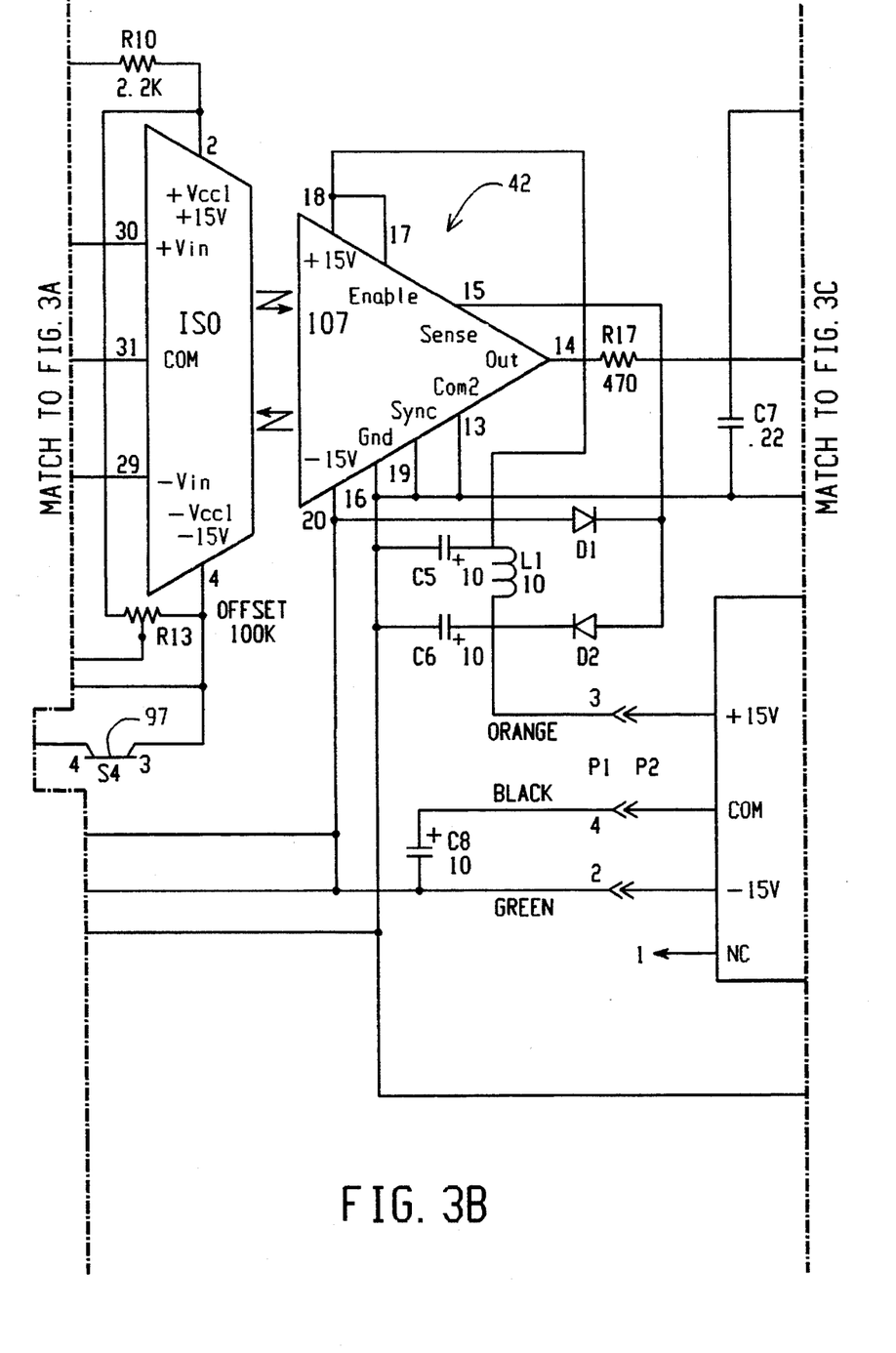
Figure 3C:
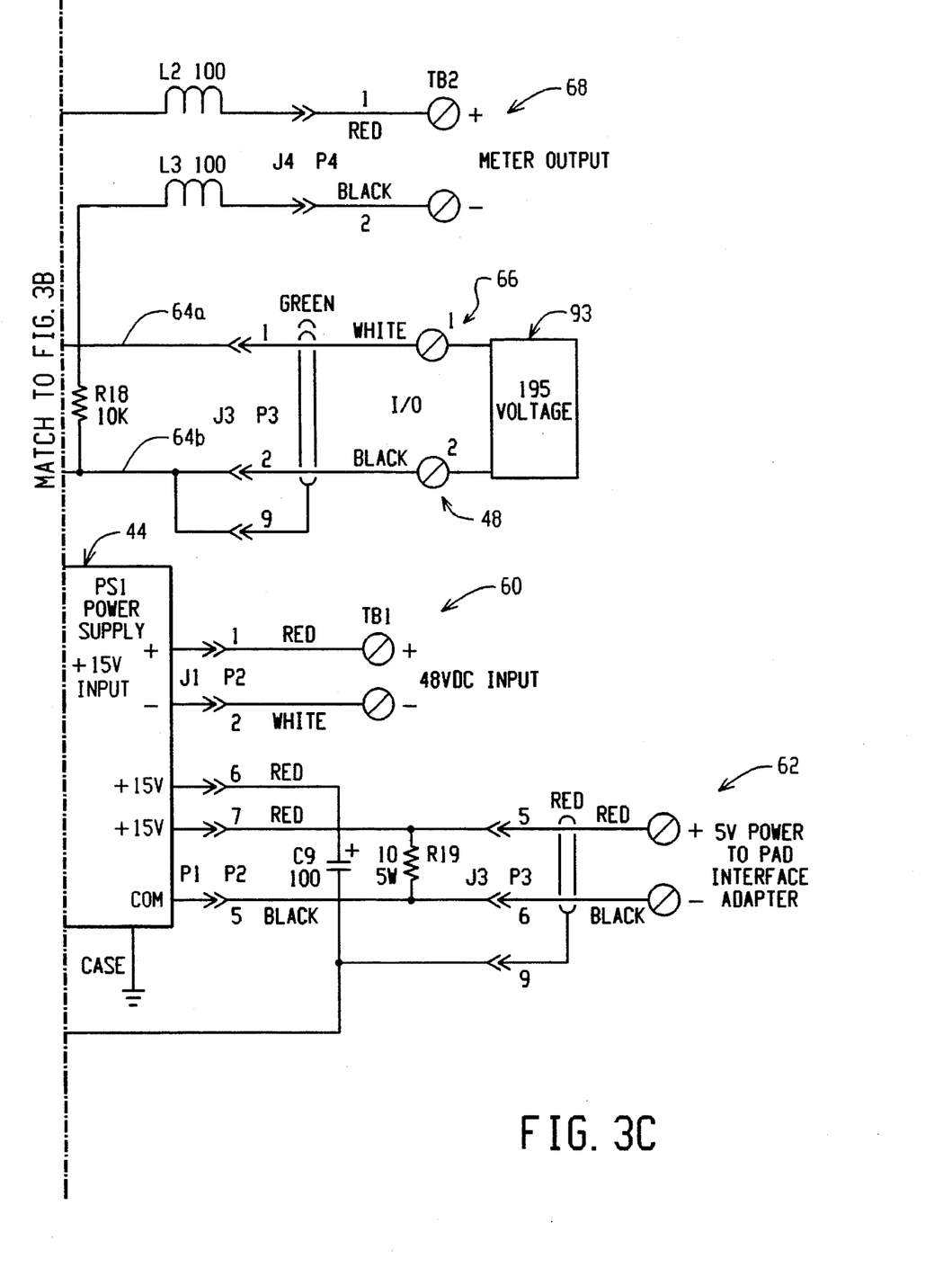

With reference now to FIG. 3, there is illustrated in electrical schematic form an embodiment of a transducer unit 30 in accordance with the present invention. This circuit is basically the detailed schematic for the functional blocks identified in FIGS. 1 and 2. Exemplary component values are provided in the drawing, however, this design is but one example and should not be construed in a limiting sense. The invention is directed more generally to the various functions carried out by the transducer 30 in association with the PLC device.

The transducer unit 30 is a differential amplifier based circuit that is electrically isolated from the switchgear unit and the PLC hardware. The transducer is energized by the +48 VDC control voltage supply from a substation by hardwired connection to terminal block TB1 as noted at 60. The +48 volt supply is input to the voltage converter 44 that produces the positive and negative supply voltages needed to operate the buffer 42 and various opto-switches. A suitable device for the power supply 44 is part no. VL 50 available from Converter Concepts Inc. The converter 44 can also be conveniently used to provide a +5 VDC supply 62 to the remote interface 56.

A suitable device for the buffer 42 is part no. ISO107 available from Burr-Brown. For the configuration shown in FIG. 3, the buffer 42 produces a 10 volt full scale output for a 1500 VDC input range from the feeder line 18. The buffer output 48 is accessed by the PLC through an I/O module on the I/O board 36. The output terminals 64a,b of the buffer 42 can be hardwired connected to terminals 66 on a terminal block of the I/O board 36. The transducer 42 output can also be distributed to a conventional meter (not shown) via terminals 68 of a terminal block associated with the switchgear for feeder voltage indication. Such an arrangement may be used, for example, in applications for which the transducer 30 is used for optical isolation and monitoring of the feeder line voltage without the use of a PLC. According to an important aspect of the invention, the transducer 30 produces an electrical output that can be conveniently interfaced to the PLC, yet is optically isolated from the feeder circuit high voltage. Thus, the remote device 56 as well as the PLC and associated I/O hardware can be connected up to the transducer by standard electrical type connections, even though true optical isolation is provided. This avoids the need for optical couplings between the PLC and the transducer. Also, the exemplary buffer device provides an isolated internal power supply for operating the active devices even with complete isolation from the PLC and I/O circuits.

In the embodiment of FIG. 3, the resistor divider network 46 includes a first series of resistors (R1–R5) connected to a divider node 70. A second series of resistors (R6, R7) are connected between the divider node 70 and the negative return line 28. The variable resistor R7 can be used to adjust the divider ratio in a known manner.

A first optically actuated switch 72 is disposed between the divider node 70 and the positive input 74 of the buffer 42. The switch 72 is used to electrically isolate the buffer input 74 from the feeder line voltage. The switch 72 is shown schematically in FIG. 3, and in actual practice may be, for example, a MOSFET type switch that is optically actuated. The switch 72 is shown in its normally closed state. The switch 72 is tripped open by operation of a photodiode 76, which emits light when a zero offset control transistor 78 is turned on.

Actuation of the zero offset control transistor 78 also causes another photodiode 80 to emit light, which causes a second optically actuated switch 82 to close (the switch 82 is normally open as shown in FIG. 3). The control transistor 78 is also optically actuated in response to a photodiode 84 emitting light. The photodiode 84 cathode is connected to a negative supply voltage of the power supply 44, while the anode is connected to a first zero offset control terminal 86 on the I/O terminal block 66. Connections 88 can be used to physically isolate the zero offset and calibrate control inputs when the I/O board is disconnected from the transducer. A second zero offset input control terminal 90 is connected to a return 91 when the connections 88 are made. Note that the switchgear case return is electrically isolated from the feeder circuit negative return 28.

The zero offset input control terminals 90,86 are connected to respective control contacts 92. The contacts are associated with an I/O module or other suitable switching device under control of the PLC 40. In FIG. 2 the auto zero contacts are shown inside a diamond box to signify that the contacts act as a control input to the transducer 30. When the PLC commands an auto zero calibration test, the contacts 92 are closed, and switch 78 conducts current, thus causing switch 72 to open and switch 82 to close. When switch 72 opens, the feeder line voltage input to the transducer 30 is disconnected from the buffer 42. At the same time, switch 82 closes, which shorts the buffer 42 inputs together, which should produce a zero or reference voltage output at the buffer output 48. Thus the switches 72,82 function to permit an auto zero test of the transducer 30. Also, the capability to short the buffer 42 inputs can be used to perform a short circuit test as described in greater detail herein.

The buffer 42 need not be designed with a zero volt output voltage for a zero volt differential input, and in fact a small positive offset may be used in some applications to insure the PLC A/D module 93 can measure the zero offset. The important feature is that when the auto zero contacts 92 are closed, the PLC can monitor the output of the buffer 42 and determine if an offset error is present, and if so, use the error as an adjustment for actual feeder line voltage measurements, especially during the load measurement test.

In addition to determining the zero offset of the transducer output 48, the PLC can also determine voltage calibration of the transducer output 48. By "voltage calibration" is meant a check of the transducer output voltage when a predetermined input is applied. The predetermined input can correspond, for example, to a feeder line voltage of nominal value (1000 VDC in this case), full scale value (1500 VDC in this case) or another selected voltage reference.

This voltage calibration operation is accomplished by use of another set of control contacts 94 associated with a relay controlled by the PLC, in a manner similar to the auto zero contacts 92. When the calibrate contacts 94 are closed, a photodiode 96 emits light and actuates a calibrate control phototransistor 97 to conduct current, thus causing another photodiode 98 to emit light. The photodiode 98 light causes a calibrate switch 99 (which is normally open) to close. Note that photodiode 76 also causes switch 72 to open (thus switch 72 opens during auto zero and calibrate tests). Closure of the calibrate switch connects an input calibrate voltage to be applied to the positive input of the buffer, such as from a series of resistors R9,R10 connected to a positive supply of the buffer 42, or alternatively from a precision voltage regulator. The calibrate voltage that is input to the buffer 42 during a calibrate test can be selected, for example, to correspond to the nominal feeder line voltage (1000 VDC), a full scale voltage (1500 VDC) or any other test voltage as desired. Thus, during the calibrate test, the PLC can monitor the transducer output voltage 48 to determine if temperature or component drift has caused a change or error in the transducer 30 output. This allows the PLC to adjust actual feeder line voltage readings to improve accuracy. The voltage calibration test can also be used to perform an open circuit test as described herein.

In accordance with an important aspect of the present invention, the opto-switches 78,97 provide excellent high voltage isolation of the transducer 30 auto zero and calibrate control inputs from the PLC. A suitable device for each of the optical control switches 78,97 is part no. OPI1264B available from Optek Technology, Inc. A suitable device for the optical switches 72, 82, 99 is part no. LBA110 available from CP Clare.

Further note that the auto zero and calibrate control switches 78,97 are actuated by the PLC without the application of electrical energy between the PLC and the transducer unit 30, but rather simply by the closure of the control contacts 92 or 94 respectively. All power to operate the optical control switches 72, 78, 82, 97, and 99 is supplied from the transducer 30 itself, which as stated is completely isolated from the PLC, I/O and feeder circuit.

The PLC is programmed in accordance with the manufacturer's specifications to perform control and test functions as needed. In particular, the transducer 30 in combination with the PLC and auto zero and calibrate control inputs to the transducer permits improved capability to perform automatic reclosing functions with load measurement, as well as short and open circuit test functions not heretofore achieved with prior known systems.

Automatic reclosing of the circuit breaker 12 is controlled by the PLC based on the load measurement test. One example of such a method will now be described.

Automatic reclosing of a circuit breaker tripped by a fault in the feeder circuit can be attempted several times (the number of times is a selectable preset in the PLC software and can be user specified by use of the remote interface 56). A reclose attempt also is commonly specified by a reclose timing cycle, such as may be selected to last 15 seconds.

Although various parameters are described herein, such as timing periods, voltage thresholds and so forth, such description is intended to be exemplary only and should not be construed in a limiting sense. Those skilled in the art will readily appreciate that these various control parameters can be adjusted depending on the particular installation for the circuit breaker. The invention also is not limited to the use of a single circuit breaker. A significant advantage of the use of a PLC is that it increases flexibility substantially over conventional reclosing systems, thereby making the invention particularly well suited to distributed control systems.

Continuing with the reclose cycle description, which is performed with the breaker in the connected position, during the first two seconds of the reclose timing cycle, the PLC checks whether the feeder line voltage is above the 183H (rail energized) stored setpoint value for a feeder circuit in the tied condition. If so, a fault on the feeder line is not present and the breaker is closed by the PLC actuating the 172Z relay. After a 12–14 second delay the PLC checks the "a" contacts of the breaker to verify breaker closure.

If the feeder line voltage is below the 183H setpoint, then the PLC stores the feeder line voltage and the program branches to the auto zero function at second two (during these first two seconds of the reclose cycle, the PLC averages a number of readings of the feeder line voltages and stores the average value, thus reducing sensitivity to transients). This is because a feeder line voltage below the 183H setpoint could be acceptable negative return voltage, or could be an indication that a fault is present. The present invention provides a convenient way to detect such negative return voltage to check if it is within specified limits, and to account for this voltage when performing the load measurement test. Prior known systems did not have negative return voltage verification or could not take it into account during the load measurement test, or could not adjust it for offset errors present in the system.

During the reclose cycle seconds two through four, the PLC closes the auto zero contacts 92, averages a number of samples of the transducer output voltage 48, and stores the value as an offset error. This zero offset is then used to adjust the stored feeder line voltage value obtained during the first two seconds. The zero offset test can be used to improve the accuracy of the load measurement and negative return voltage measurement, as well as for monitoring of the feeder line voltage during normal operation of the feeder circuit.

In the tied condition, if the feeder line voltage (as adjusted for the detected zero offset error) is above the 183L setpoint (negative return voltage limit), the PLC program waits for the end of the cycle period (in this case 15 seconds), updates a cycle counter and restarts the reclose sequence, provided that the number of reclose attempts does not exceed the reclose attempts setpoint (in this case four attempts can be made). If the adjusted feeder line voltage is below the 183L setpoint, then the program proceeds to the load measurement routine.

Load measurement is initiated at cycle seconds four through eight by the PLC opening the auto zero contacts 92 and closing the 173 contacts (FIG. 2) to connect the LMR into the feeder circuit. At cycle seconds eight and nine, the PLC reads the feeder line voltage and averages a number of readings and stores the averaged value. This value is then adjusted for the zero offset as earlier determined during the auto zero test. The PLC then calculates the feeder circuit impedance based on the feeder line voltage and the nominal main bus DC voltage (in this case, 1000 VDC) and the known LMR resistance.

The measured feeder circuit impedance is then compared to the 182 setpoint (track or fault resistance). If the impedance is above the 182 setpoint (keeping in mind that this measured impedance is highly accurate as it is compensated for the negative return voltage and zero offset), then the breaker 12 can be closed by activating the 172Z relay for two seconds.

If the measured impedance is below the 182 setpoint (less than 0.2 ohm in this case), the PLC waits until the end of the reclose cycle period, updates the cycle counter, and restarts the reclose sequence, if the number of attempts is below the setpoint.

At cycle second eleven (after the two second delay following contact 172Z closure), the 172Z contacts are opened and at seconds fourteen and fifteen the breaker "a" contacts status is checked to verify the breaker is closed. If the "a" contacts indicate the breaker is open, the reclose cycle can be restarted if the maximum number of attempts has not been reached.

Thus, breaker automatic reclosure is significantly improved by the use of the PLC with the ability to accurately account for zero offset and negative return voltage.

Voltage calibration (e.g. nominal or full scale) of the transducer output 48 is easily available to the PLC, which in this case can be used to accurately calibrate the nominal or full scale output of the transducer 30. The auto zero test is first performed to determine the zero offset and negative return voltage, if any. The auto-zero contacts are then opened, and the PLC then closes the calibrate contacts 94. This causes a predetermined calibrate input signal to be applied to the buffer 42, such as to simulate a full scale or nominal feeder line voltage. The PLC detects and stores this calibration value and uses it to adjust feeder line voltage readings as needed.

The auto zero and calibrate functions also can be used by the PLC to test proper operation of the circuit breaker for open and short circuit conditions, not heretofore available in prior known systems. These tests verify proper operation of not only the circuit breaker itself, but the entire reclosing system 10 including the PLC, software, I/O modules and the control relays, by essentially applying simulated feeder line voltages to the transducer buffer 42.

The open and short circuit tests are performed with the circuit breaker 12 in the test position only, and can simulate load measurement without actual closure of the 173 contacts. Open and/or short circuit testing is not permitted in the connected position as a basic safety consideration. Another lockout feature can be implemented by only permitting the test sequences to be performed by use of the remote interface with the circuit breaker in the test position.

The short circuit test begins with the breaker in a tripped or open condition. The PLC can check this via the status of the breaker "a" contacts, and the breaker can be tripped if closed (although typically a breaker cannot be racked out of the cell if it is closed). A short circuit is simulated by the PLC initiating the auto zero function (closing the auto zero contacts 92) because this function shorts the inputs to the buffer 42. The normal zero offset test as described herein can then be performed, followed by the reclose sequence described hereinbefore, except that the 173 contacts are not closed to insert the LMR. Closure of the auto zero contacts should result in the circuit breaker remaining tripped or open, which the PLC can check via the breaker "a" contacts. This verifies that the reclose sequence did not result in a command to close the breaker.

An open circuit test can also be performed. The auto zero test is first performed as described, and then the auto zero contacts 92 are opened, and the calibrate contacts 94 are closed by the PLC. This applies a simulated feeder line voltage to the buffer 42, and the PLC reads the transducer output voltage 48 and adjusts it for the zero offset measurement. The applied simulated feeder line voltage (simulating full scale or nominal voltage, for example) is stored and the PLC then starts the reclose sequence, as if the breaker were racked in the cell. The system 10 should operate to close the relay in a manner similar to the described reclose sequence described hereinbefore, except that the load measurement test is not performed (via closure of the 173 contacts).

As stated, the remote interface can permit local adjustment of the various control parameters and setpoints for a particular installation.

The preceding discussion described the self-test functions (including open and short circuit tests), auto zero and calibrate functions, and the apparatus and methods by which these operations facilitate automatic reclosure and load measurement, in accordance with the present invention. Those skilled in the art will readily appreciate that in complex systems, such as in this case a transit system, the PLC will be programmed to control and monitor many functions in the circuit breaker and switchgear by means of a number of latching and control relays, relay meters and other conventional breaker and switchgear electrical elements.

The following is a more detailed discussion of some of the exemplary functions that can be controlled by the PLC, using commonly understood industry device function number references (as explained hereinbefore with respect to device 195) to various control elements and parameters. A detailed schematic is not required because the various elements are conventional in design. The invention is more generally directed to the implementation of the above described auto zero, calibrate, load measurement, negative return voltage measurement, open and short circuit tests and reclose functions, as embodied in the apparatus 10 described herein. The apparatus 10, however, facilitates the implementation of additional functions as described hereinafter.

As stated hereinbefore, the automatic reclosing relay (Device 195) is mainly a two component integrated package consisting, in the described embodiment, of a single-board Programmable Controller (PLC) with a contact rail voltage transducer 30 (CRVT). The system also includes a load-measuring resistor (LMR) with fuses, and a load measuring contactor (173). The device 195 system allows closing of the breaker 12 to be initiated by either local or remote supervisory control, and auto-reclosing is permitted only if the trip was by a 185 transfer trip, 176 direct-acting overcurrent trip, or the 150 rate-of-rise trip. Reclosing is not permitted when the breaker is opened by the 172/CS local control switch, 172/TS breaker test switch, supervisory control, or the 186 station lockout relay. Load measurement is performed for both the stub and tied system conditions.

The 195 relay system's integrated controller with the transducer 30 compensates for the presence of negative return circuit voltage, and also is self-calibrating to enhance measurement accuracy above that possible with conventional relay systems. A test mode allows immediate closure without load measurement only if the breaker is in the TEST position in the enclosure. Use of the remote interface 56 allows further 195 automatic reclosing system tests to be performed, verification of correct operation with open-circuit and short-circuit (faulted track) inputs, and provides the capability to verify and adjust the 195 relay system setpoints and timing cycles.

The Load Measuring Relay (Device 182) and Voltage Sensing Relay (Device 183) functions are incorporated into the 195 relay system. Several other functions such as the Track Potential Relay (Device 127), and DC Latching Relay (Device 194), can also accomplished by the programmable controller.

EXEMPLARY OPERATING SEQUENCES

When the DC feeder breaker is open and in the TEST position in the breaker cell, the breaker can be closed immediately by operation of the Circuit Breaker Test Switch, Device 172TS, to the CLOSE position, without operation of the load measure circuit. The load measure contactor, Device 173, is not operated in this cycle. Information on breaker position in the cell is conveyed to the controller by the Circuit Breaker Position Switch, Device 33, which is closed when the breaker is in the CONNECTED position, thus energizing the 195 Device's POSITION input.

Additional test modes may be accessed with the breaker in the TEST position by use of the remote interface 56 Portable Access Device (PAD) which provides an operator maintenance interface. This device, when connected to the RS232 port on the 195 relay system controller, allows test initiation of the load measurement cycle (without actual closure of the load measure contactor, Device 173) to check proper operation sequence with both simulated feeder voltage inputs of open-circuit and short-circuit. Relay set-points are displayed on the PAD screen, and are adjustable by the operator using it's keyboard. The 195 Device calibrate (CAL) output control 94 is a test function used during the open-circuit operation sequence check. The CAL function simulates 1000 VDC contact rail voltage by injecting an equivalent input into the contact rail voltage transducer buffer 42. This allows the open-circuit load measurement cycle to be tested without actual bus voltage being applied, and also allows an overall system calibration point.

When the DC feeder breaker is in the CONNECTED position, the automatic reclosing system circuit is enabled and closing will only occur after the load measuring system has determined that the track system is free of shorts or overloads. Activation of the circuit is initiated by closure of the manual Control Switch 172CS if the LOCAL/REMOTE switch 143 is in the LOCAL position, or by the 199C contact from supervisory control if the LOCAL/REMOTE switch 143 is in the REMOTE position, by application of a close signal to the 195 Device's OPERATE input. Automatic reclosing is permitted for any condition that trips the breaker open unless the 195 device is reset by a signal to the RESET input.

A RESET signal and trip will occur for trips from the local manual Control Switch 172CS, a remote supervisory trip by the 199T contact, the station lockout relay Device 186, or by the Circuit Breaker Test Switch 172TS. A breaker trip is accomplished through the 195 Device's 169 TRIP contact output via the 169X auxiliary relay, to the breaker trip coil, 172TC.

In the tied condition, when the contact rail is energized from an adjacent substation, if the voltage on the contact rail as measured by the contact rail voltage input transducer 30 is above the pre-selected rail energized set-point voltage (183H Device function adjustable over the range of 700 V to 1200 V), the feeder breaker will be immediately closed by operation of the 195 Device's 172Z CLOSE contact output, via the 172ZX auxiliary relay.

In the stub condition when the contact rail is not energized from an adjacent substation, the voltage on the contact rail is also measured by the contact rail voltage input transducer 30. If the voltage is below the pre-selected rail energized set-point voltage (183H Device function adjustable over the range of 700 to 1200 V), the transducer automatic-zero measurement mode is initiated to ensure accuracy of the voltage measurement at low voltages. This is the 195 Device's AUTO-ZERO function as described hereinbefore. This voltage reading is corrected for any zero offset, and if the resulting corrected voltage reading is above the negative return voltage lockout set-point, no load measurement attempt is made until the cycle is restarted after 15 seconds. The number of reclose attempts is selectable between one and four, before lockout occurs. The lockout may be reset by a CLOSE command from either the 172CS Control Switch in LOCAL mode, or the 199C close contact for REMOTE supervisory close.

If the corrected negative return voltage is less than the setpoint, the 15 second load measurement cycle is initiated. The load measurement contactor Device 173 is closed, inserting the load measurement resistor (LMR) between the DC main bus 1000 VDC (nominal) bus and the feeder line. The flow of current is limited by this resistor into any load or fault on the track circuit. The feeder output voltage resulting is a function of this load resistance and any load or track fault resistance, and is measured by the transducer 30. This voltage reading is corrected for the effects of the previously measured negative return voltage, and the equivalent track resistance is calculated by the controller. The 173 device contactor is then opened to remove the measurement resistor (LMR) from the circuit. If the equivalent track resistance is higher than the previously selected set-point (between 0.2 and 1.0 ohms), the breaker is closed by operating the 195 Device's 172Z CLOSE contact output. The breaker is closed by the 172ZX and 172X auxiliary relays, while the 172Y is a time delay relay providing anti-pumping and closing coil energization time-limit functions. Feeder breaker open-closed status information is provided to the controller by the 195 Device STATUS input from a breaker 172 "a" contact.

A breaker close operation is considered to be successful if the breaker is still closed 5 seconds after the 195 Device's 172Z CLOSE signal. A counter is started to count the number of successful reclose operations within an adjustable interval of two to six minutes. If the feeder breaker is then tripped, recloses successfully, and then trips again within the time interval selected, further reclose attempts are locked-out. Again, the lockout is reset by a CLOSE command from the local 172CS Control Switch when in LOCAL mode, or from the 199C contact when in REMOTE supervisory control.

If the equivalent track resistance is lower than the previously selected set-point (between 0.2 and 1.0 ohms), the breaker is not closed and the load measurement cycle is terminated for the remainder of the 15 second cycle interval. Depending upon the previously selected number of reclose attempts permitted (one to four), either another reclose attempt is made after the completion of the initial 15 second cycle, or further reclose attempts are locked-out. Again, the lockout is reset by a CLOSE command from the local 172CS Control Switch when in LOCAL mode, or the 199C contact when in REMOTE supervisory control.

The 195 Device's INHIBIT input prevents automatic reclosing and load measurement when an enable signal is absent. This feature is used for breaker interlocking in Gap Breaker stations.

The Track Potential Relay, Device 127, is incorporated into the load measurement relay programmable controller functions. The track potential is continually monitored by the contact rail voltage transducer 30. The controller energizes the 195 Device's 127 output contact and the 127X auxiliary relay if the track potential is above 500 V. The 127 output contact is released when the voltage drops below 400 V.

On power-up, the controller 40 performs a series of hardware self tests to assure proper system function. If a problem is discovered, an ERROR LED indication appears on the controller. While operating properly, a system monitor LED flashes at a 1 Hz rate. Also on power-up, all controller output contacts remain in the default un-energized condition. Therefore, any pre-existing breaker state is preserved. The 127 Device output contacts will operate immediately if the track potential is above 500 V. If the breaker is CONNECTED and open when power is applied to the 195 Device's controller, the normal operation start sequence is initiated where the system waits for a close command. If the breaker is CONNECTED and closed, and if power to the 195 Device's controller is lost and then returned, the breaker will remain closed and the controller will be placed in the automatic load measurement reclose mode of operation (pre-existing condition). The breaker can always be tripped open by the protective 150 overcurrent, 185 transfer-trip relaying, and the breaker series trip 176 Device.

Use of the remote interface with the breaker in the TEST position allows further system testing to be performed under operator control, and the ability to verify and adjust relay voltage set-points and timing cycles. A Calibration mode allows adjustment of the CRVT internal fixed settings if the proper test equipment is available. This includes the CRVT zero-off set, overall system gain, and internal calibration voltage reference settings.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Automatic reclosing apparatus for a DC feeder circuit breaker connectable between a main power bus and a feeder line, comprising: transducer means connectable to the feeder line and a return bus for producing an output signal that corresponds to voltage on the feeder line; and programmable control means connectable to the breaker for reclosing the breaker when a fault condition is absent and for preventing breaker closure when a fault condition is present; said control means coupled to said transducer means for controlled calibration of said transducer means output signal by providing input control signals to said transducer means and detecting said transducer output signal.

2. The apparatus of claim 1 wherein said control means is coupled to said transducer means for zero offset and voltage calibration of said transducer output signal.

3. The apparatus of claim 1 further comprising first switch means responsive to closure of a first set of contacts by said control means, said first switch means disconnecting said transducer means from said main bus and applying a short circuit input to said transducer means, both functions occurring in response to said contact closure.

4. The apparatus of claim 3 wherein said control means detects and stores said transducer means output signal value as an offset compensation value during a zero offset operation initiated by said control means closing said first set of contacts.

5. The apparatus of claim 4 wherein said control means performs a load measuring operation after a zero offset operation prior to attempting closure of the breaker, said load measuring operation being performed by connecting a load measuring impedance between said main power bus and said feeder line.

6. The apparatus of claim 5 wherein said control means detects negative return voltage on the feeder line after a zero offset operation and before performing a load measuring operation.

7. The apparatus of claim 6 wherein a load measuring operation is performed by said control means to determine if breaker closure can be attempted; said apparatus further comprising load measuring contactor means for connecting said transducer means to the feeder line through a current limiting resistor (LMR); said control means actuating said contactor means if said negative return voltage is below a predetermined threshold.

8. The apparatus of claim 7 wherein said control means detects a load fault condition by detecting feeder line voltage when said load measuring contactor means is actuated, said control means compensating said feeder line load measurement voltage for said offset compensation value and said detected negative return voltage.

9. The apparatus of claim 3 wherein said zero offset determination is used as a short circuit test when the breaker is in a test position unconnected from the main bus.

10. The apparatus of claim 2 wherein said voltage calibration operation can be used as an open circuit test by said control means applying an input voltage calibration signal to said transducer means when the breaker is in a test position unconnected from the main bus.

11. The apparatus of claim 1 wherein said transducer means output signal is optically isolated from its high voltage input, and said control means input control to said transducer means is optically coupled thereto.

12. The apparatus of claim 1 wherein said control means initiates zero offset detection by a control signal that is optically coupled to a switch powered by said transducer means and optically isolated from said control means.

13. Apparatus for testing and controlling a DC feeder circuit breaker connectable between a power bus and a feeder line, comprising: transducer means connectable between the feeder line and a return bus for producing a transducer output that corresponds to voltage on the feeder line; and control means for determining and controlling when breaker reclosing can be initiated after a fault condition trips the breaker; said control means being coupled to said transducer means for calibrating said transducer output and for performing load measurement by providing input control signals to said transducer means and detecting said transducer output.

14. The apparatus of claim 13 wherein said control means initiates a test sequence for open and short circuit operation when the breaker is in the test position.

15. The apparatus of claim 13 wherein said control means calibrates said transducer output by performing a zero offset test and short circuit test by shorting the inputs of said transducer means.

16. The apparatus of claim 15 wherein said control means performs a voltage calibration test and open circuit test by applying a simulated power bus voltage input to said transducer means.

17. The apparatus of claim 15 wherein said control means actuates a set of switches that disconnect said transducer means from the feeder line during said zero offset and short circuit tests.

18. The apparatus of claim 13 wherein said control means produces transducer means control signals that are optically coupled from said control means to said transducer means.

19. The apparatus of claim 18 wherein said control means actuates optical switches in said transducer means, said switches being energized from power delivered by said transducer means.

20. The apparatus of claim 19 wherein said control means actuates said switches by closing control contacts.

21. The apparatus of claim 13 wherein said control means initiates a zero offset test of said transducer means when the breaker is in a test position.

22. The apparatus of claim 13 wherein said control means initiates a voltage calibration test of said transducer means when said breaker is in a test position.

23. The apparatus of claim 21 wherein said control means tests negative return voltage on the feeder line after performing said zero offset test.

24. The apparatus of claim 23 wherein said negative return voltage is used with said zero offset test result as a calibration value during load measuring test when the breaker is in a connected position.

25. A method for controlling automatic reclosing of a DC feeder circuit breaker comprising the steps of:
  a. using a transducer to produce an output that corresponds to voltage on a feeder line;
  b. using a programmable device to control reclosing of the circuit when a fault is not present; and
  c. using the programmable device to control operation of the transducer to calibrate the transducer output by providing input control signals to the transducer and detecting said transducer output.

26. The method according to claim 25 wherein said calibration step includes a zero offset test that also is preformed as a short circuit test, by applying a short circuit input to the transducer, the zero offset test being used to produce an offset value that is used to compensate load measurement and negative return voltage measurement.

27. The method according to claim 25 wherein said calibration step includes a voltage calibration test that also is performed as an open circuit test by applying an input voltage calibration signal to the transducer.

28. The method according to claim 25 wherein said calibrate step includes a negative return voltage measurement performed prior to a load measurement test.

29. In combination, a DC feeder circuit breaker connected between a main power bus and a feeder line, and a transducer coupled to the feeder line and a return; said transducer having an output and producing an output voltage that represents the feeder line voltage, said output being optically isolated from the feeder line voltage.

30. The combination of claim 29 wherein said transducer provides an isolated power supply for a transducer calibration control circuit on the feeder line side of the transducer.

31. The combination according to claim 30 further comprising a programmable controller optically coupled to the transducer for controlled calibration testing of said transducer output voltage.

32. The combination of claim 31 wherein said calibration function includes zero offset and voltage calibration tests.

* * * * *